Nov. 5, 1935.   F. B. CLARK   2,019,843
AUTOMATIC STACKING APPARATUS
Filed Nov. 17, 1934   5 Sheets-Sheet 1

INVENTOR.
FREDERIC B. CLARK
BY
ATTORNEY.

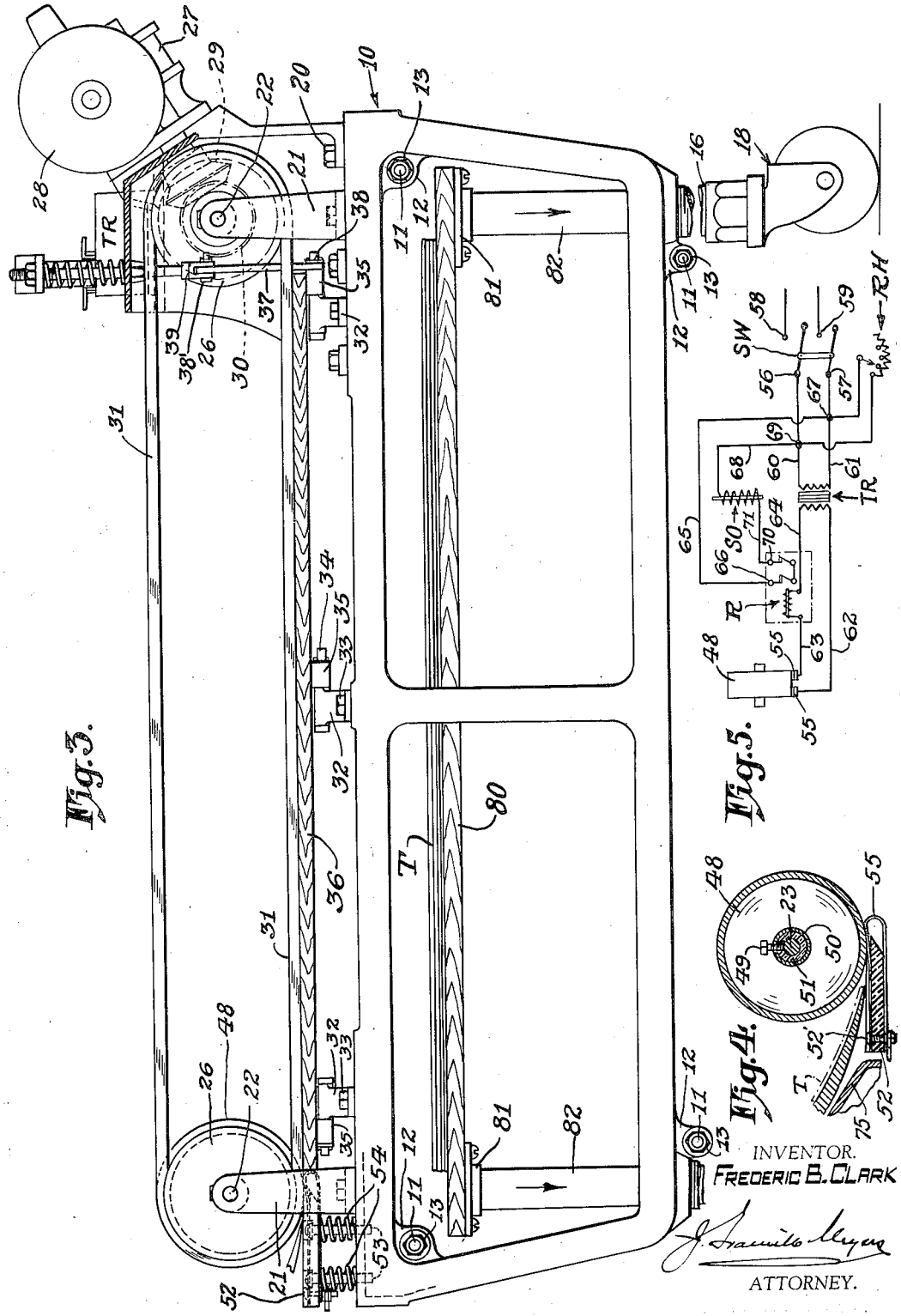

Nov. 5, 1935.   F. B. CLARK   2,019,843
AUTOMATIC STACKING APPARATUS
Filed Nov. 17, 1934   5 Sheets-Sheet 3

INVENTOR.
FREDERIC B. CLARK
BY
ATTORNEY.

Nov. 5, 1935.   F. B. CLARK   2,019,843
AUTOMATIC STACKING APPARATUS
Filed Nov. 17, 1934   5 Sheets-Sheet 4
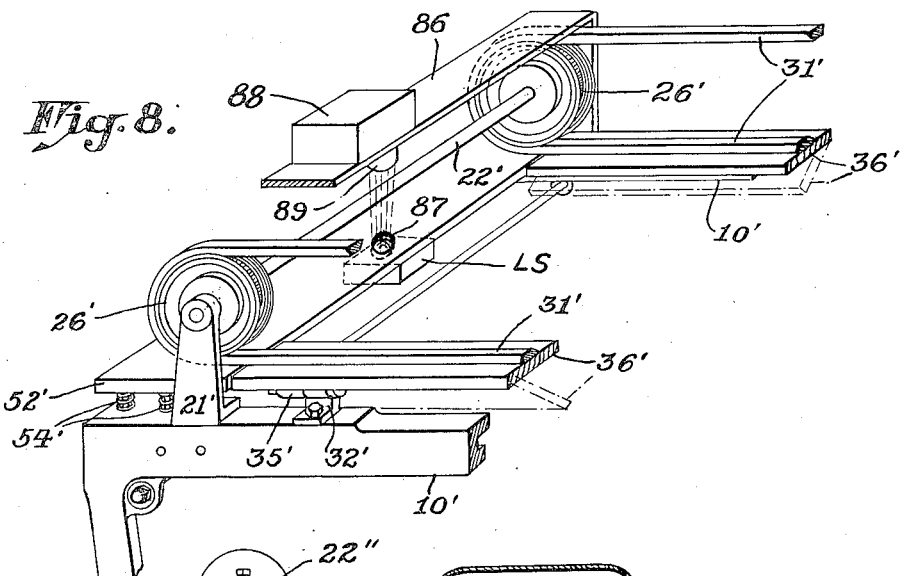
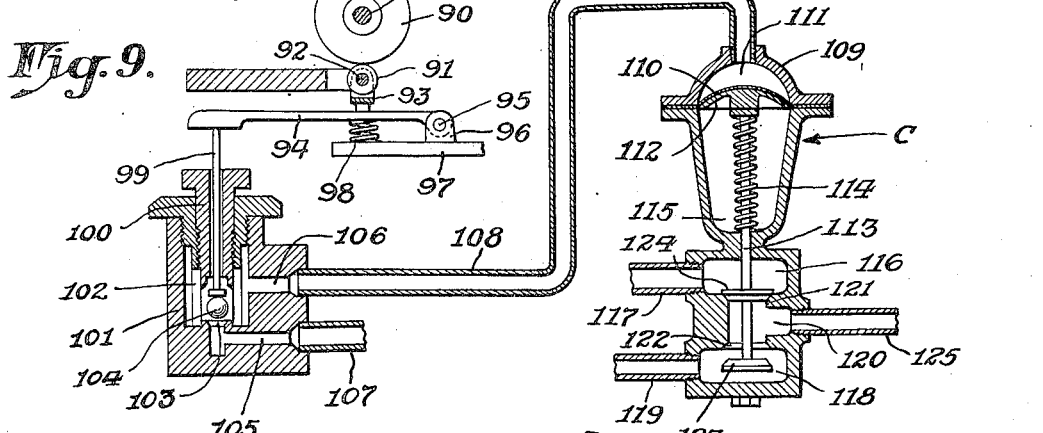
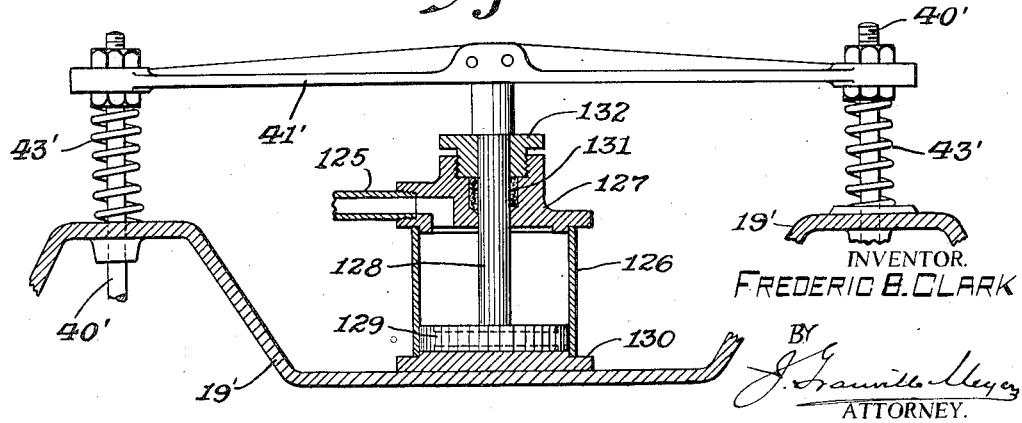
INVENTOR.
FREDERIC B. CLARK
BY
ATTORNEY.

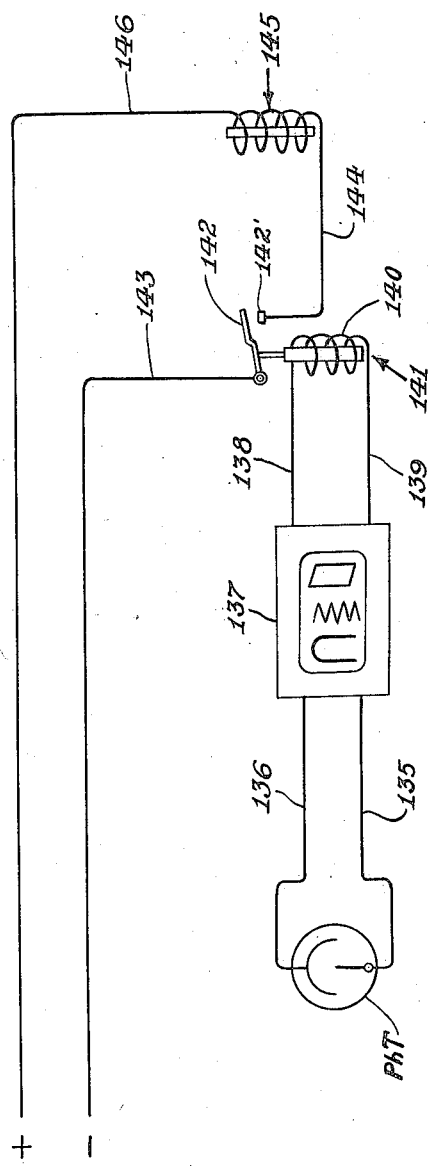
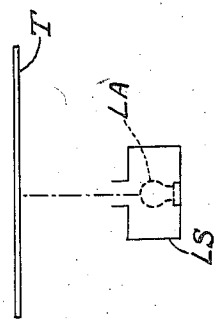
Fig.10.

Patented Nov. 5, 1935

2,019,843

UNITED STATES PATENT OFFICE 2,019,843

AUTOMATIC STACKING APPARATUS

Frederic B. Clark, Englewood, N. J.

Application November 17, 1934, Serial No. 753,533

9 Claims. (Cl. 271—83)

My invention relates to apparatus or machines for stacking articles from a source of supply into predetermined position relative to each other on a platform or conveyor.

The principal general object of my present invention is to provide in a machine or apparatus for the above purpose, mechanism to receive and advance a succession of the articles in a definite path to predetermined positions, with means operable or controlled by the movements of the articles to effect release of the articles at said predetermined positions for stacking.

The invention is illustrated in the present application in the nature of stacking apparatus for sheet materials such as towels or other flexible sheet articles, but I wish it understood that the invention broadly may be utilized for advancing and stacking various types of articles other than towels and the like.

More specifically the objects of the invention include in a machine or apparatus of the character specified, the provision of movable supports to receive opposite marginal portions of the articles, and means to grip the articles against said supports and to move them therealong predetermined distances determined by the dimensions of the articles in the direction in which they move, with means automatically controlled by the movements of said articles to move said supports away from gripping engagement relative to said gripping and conveying means to release the articles and to cause them to be deposited at a common predetermined point in their paths of travel one on the other.

Another object of the invention is to provide electrically controlled means for operating the movable supports whereby the articles will be moved in succession across the supports at a rapid rate one after the other and stacked in an even pile. This object is accomplished generally by providing that the electric circuit or circuits controlling the movements of the movable supports is or are made and broken by the movement of the articles, so that in effect the articles are "measured" as they pass over the supports from the source of supply, whereby articles of different sizes may be handled or stacked by one machine, as pointed out hereinafter.

Another object of the invention is to provide mechanical or non-electric means for accomplishing the movements and stacking of the articles in the manner specified.

Another object of the invention is to provide a receiving table or support on which the articles are stacked, normally positioned adjacent the movable supports to receive the articles therefrom, and which is automatically lowered by the weight of the articles deposited so that the topmost article is always dropped from the movable supports substantially the same distance as the preceding articles.

Another object of the invention is to provide stacking apparatus of the above type which may be used in conjunction with flat work ironers or other standard equipment of laundries, textile mills, or the like, without altering the construction of the flat work ironers, and to also provide whereby a plurality or battery of the stackers may be used in connection with one flat work ironer or similar apparatus.

The foregoing and other objects and advantages of the invention will be specifically pointed out during the course of the following detailed description of the accompanying drawings, in which Fig. 1 is an end elevation partly in section of a stacking machine embodying my present invention;

Fig. 3 is a side elevation partly in section of the same machine;

Fig. 4 is a fragmentary vertical sectional view through the contact roller and cooperating parts at the intake end of the stacking machine;

Fig. 5 is an electrical diagram showing the circuits for controlling the operation of the movable supports;

Fig. 8 is a perspective view of the intake end of the stacking machine showing the adaptation of a "photoelectric eye" mechanism thereto;

Figs. 9 and 9a are fragmentary views partly in section and partly in elevation illustrating mechanical control means for accomplishing stacking of articles; and Fig. 10 shows an electric circuit including a light sensitive device and solenoid for controlling the operation of the movable supports.

Figure 1:
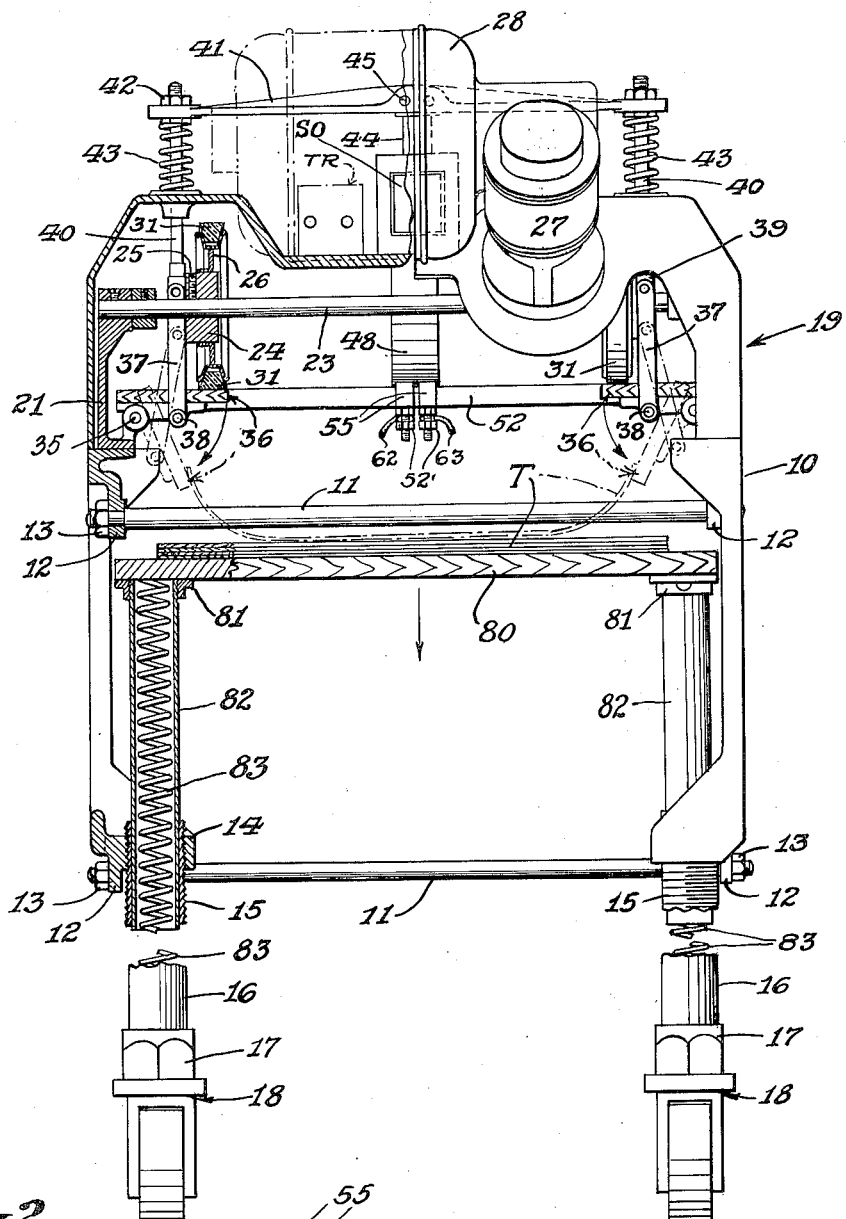

In the drawings, the numeral 10 designates the frame of the machine composed of opposite side pieces interconnected by elongated bolts 11 extending through brackets 12 formed as a part of the sides of the frame, nuts 13 being threaded onto the ends of the elongated bolts 11 to draw and hold the sides together. The corners of the frame are provided with bosses 14 screw threaded on their interiors to receive sleeves 15 having screw threads cooperating with those on the bosses 14. The lower ends of the sleeves 15 designated by the numeral 16 are mounted in couplings 17 on casters 18.

The frame 10 is thus supported upon the sleeves 16 which serve as legs, and on top of the frame 10, at one end thereof is mounted a housing or superstructure designated generally by the numeral 19. As shown best in Fig. 3, the superstructure 19 is secured to the top of the frame 10 by bolts 20 which pass through extensions on the lower end of the superstructure and into the frame 10.

Alined pairs of brackets 21 are located adjacent the ends of the frame and on top thereof and are provided in their upper ends with openings to receive the ends 22 of shafts 23 to which are keyed blocks 24, as by means of set screws 25, the blocks carrying for rotation therewith pulleys 26. Mounted on the superstructure or housing 19 is a gear reducer 27 driven by an electric motor 28 also shown mounted on the superstructure. The gear reducer 27 drives a beveled gear 29 which meshes with a gear wheel 30 on one of the shafts 23. Trained around the pulleys 26 are belts 31 shown as of substantially frusto-conical shape in cross-section to fit in the grooves of the pulleys 26 to be driven thereby when the gears 29 and 30 drives said one of the shafts 23.

At regular intervals along the sides and on top of the frame 10 are provided brackets 32 secured to the frame, as by means of bolts 33 and each provided in its upper end with a bearing for a pin 34. Mounted on the pins 34 are hinge members 35 which extend inwardly and which are secured to the undersides of boards or other smooth plates 36, there being one of said plates at each side of the frame and with the inner ends thereof disposed beneath and normally in contact with the lower flights of the belts 31. Each of the boards or plates 36 extends substantially from adjacent one end of the frame to the other, and, of course, the length of the boards, and/or the distance which they are spaced apart may be varied to meet the requirements for different types or sizes of articles to be stacked.

Boards or plates 36 may be moved from the full line position of Fig. 1 to the dotted line position thereof by movement with the hinges 35 on pins 34 by mechanism about to be described. Links 37, one at each side of the superstructure or housing 19, are pivotally connected at 38 to the hinge members 35 located within the housing or superstructure 19, and are pivotally connected at 38 to couplings 39, which in turn are connected to actuating rods 40 which extend through openings in the upper walls of the housing or superstructure 19. The upper ends of the actuating rods 40 are mounted through openings in the ends of a cross-beam 41 and receive nuts 42 coupling the rods to the cross-beam. Coil springs 43 are compressed between the top of the superstructure and the ends of the cross-beam 41 surrounding the actuating rods 40 to normally hold the parts in the full line position of Fig. 1, with the boards or plates 36 in engagement with or urged toward the belts 31.

A solenoid "SO" is mounted on the superstructure and is operatively connected to a plunger 44 connected as at 45 to the cross-beam 41 at its approximate center. The operation of the solenoid is such that when it is energized it draws the plunger 44 and cross-beam 41 down against the action of the springs 43, whereby the actuating rods which are coupled to the cross-beam by the nuts 42, move the links 37 and hinge members 35 to the dotted line position of Fig. 1; and when the solenoid is de-energized, the springs 43 move the beam 41 and actuating rods 40 upwardly to return the links 37 and hinge members 35 and plates 36 to the full line position of Fig. 1.

Figure 2:
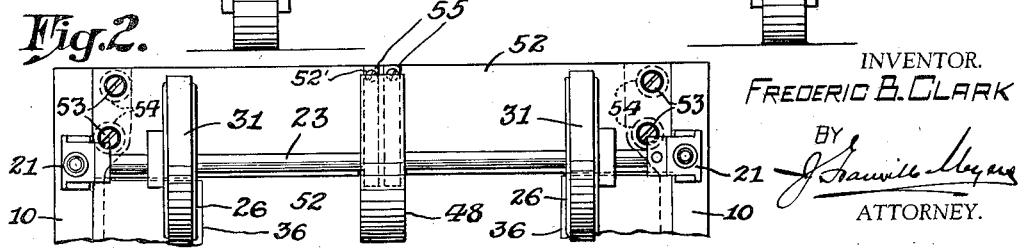
Fig. 2 is a fragmentary plan view of the intake end of the stacking machine.

The mechanism for controlling the electric circuit hereinafter described to operate the solenoid "SO", is located adjacent the intake end of frame 10 or end remote from the superstructure or housing 19, and is shown best in Figs. 2, 3 and 4. Referring to these figures, it will be noted that one of the shafts 23 has keyed thereto, a cylinder or wheel 48 as by means of a screw 49, and the shaft 23 is insulated from the inner flange 50 of the wheel 48 by an insulating or non-conducting cylinder 51. An insulating board or plate 52 is supported above and across the intake end of the machine by bolts 53, the heads of which engage the upper surface of the board and the lower ends of which are threaded into the frame 10. Coil springs 54 surround the bolts 53 and resiliently support the board 52 above the frame 10. A pair of spaced electrical contacts 55 are attached to the board 52 by means of screws 52', to which the wires hereinafter referred to and leading from the source of electric supply are attached. The spring contacts 55 are disposed beneath the contact wheel 48 with their ends normally in contact with the outer surface of the wheel or cylinder 48.

Referring now to Fig. 5, wherein the electric wiring diagram is shown, the letters "SW" indicate a switch connected to terminals 56 and 57 and movable into and out of engagement with terminals 58 and 59 which are connected to wires leading in from the source of electric supply. Wires 60 and 61 connect the terminals 56, 57 with a transformer TR. A wire 62 connects one side of the transformer to one of the contacts 55, while the other contact 55 is connected by a wire 63 to the relay R, which in turn is connected by a wire 64 to the other side of transformer TR. Thus, with the switch SW closed connecting the terminals 56 and 57 with the terminals 58 and 59, a current of predetermined voltage flows through wires 62, 63 and 64 and the relay when the contacts 55 are in engagement with the cylinder 48. When this circuit is completed, as just mentioned, the relay R energizes the solenoid SO by a circuit completed through wire 65 connected with the terminal 66 of the relay, and with the wire 61 at 67, and wire 68 connected to the wire 60 at 69 and to the solenoid, which is also connected with the terminal 70 of the relay by a wire 71. Thus the solenoid is energized and de-energized according to whether or not the contacts 55 are in engagement with the cylinder 48, and it is the feeding of the articles between the cylinder 48 and the contacts 55 which breaks the circuit and de-energizes the solenoid, as will be presently pointed out more in detail.

If desired the motor 28 may be a variable speed motor to control the rate of rotation of the gears which drive the pulleys and belts 31, and may be included in the circuit between the transformer and the switch SW. It is also possible, as I have shown in Fig. 5, to include a rheostat RH in the circuit between the transformer and switch SW, so that it can be utilized to vary the speeds of the motor. This of course is optional.

Figure 6:
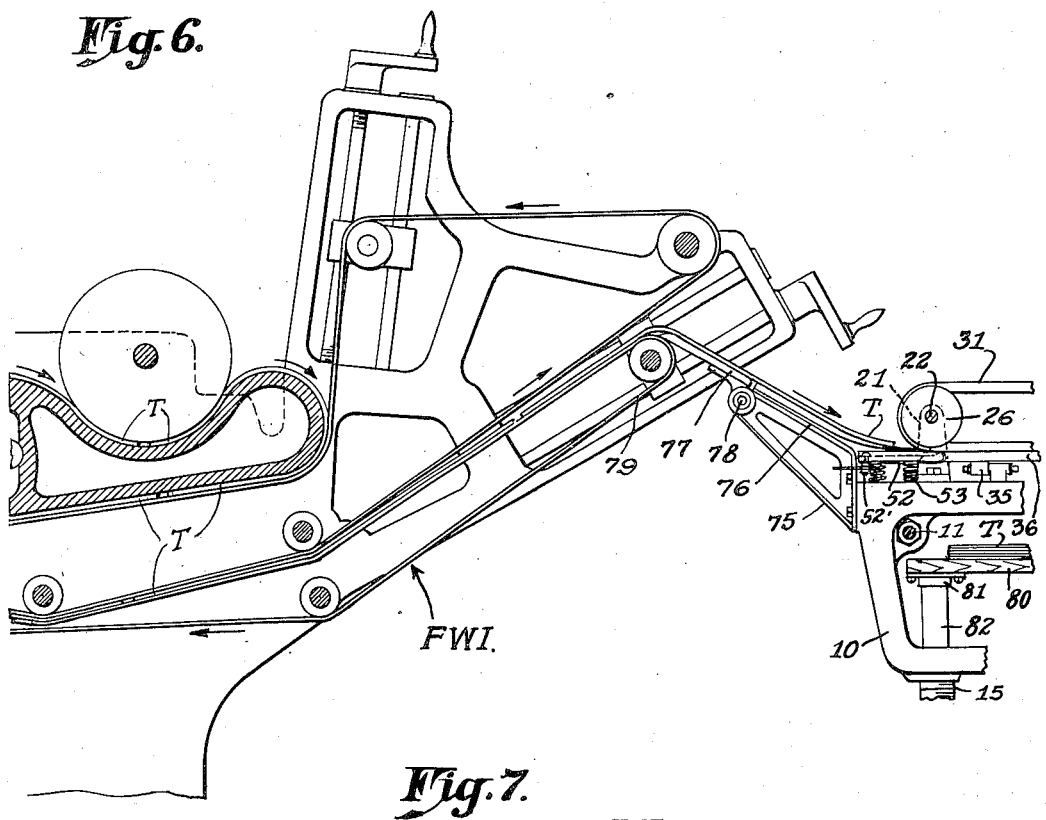
Fig. 6 is a side elevation of fragments of the outlet end of a flat work ironer and the intake end of a stacking machine showing an attachment on the stacking machine to guide the articles from the ironer to the stacker.

The operation of the machine will perhaps be better understood after reference is had to Fig. 6, wherein the intake end of the frame 10 is shown provided with a bracket 75 extending upwardly therefrom at an angle of inclination and having a smooth inclined wall 76 along which flat work or articles may be fed into the machine for stacking. The bracket 75 also supports a plate 77 hingedly connected to the bracket at 78, so that it may be swung into the plane of and into alinement with the wall 76 as a continuation thereof to terminate adjacent the discharge belt 79 of the flat work ironer, designated generally by the letters FWI. Since the flat work ironer is of known construction, I will not go into the details of the construction and operation thereof, except to state that towels or other sheet materials being discharged from the flat work ironer by the belt 79 will slide down the chute provided by the smooth surfaces of the parts 77 and 76, and then between the belts 31 and boards 36, to be gripped therebetween to be fed along the boards toward the superstructure or housing 19. As soon as the forward ends of the towels pass between the cylinder 48 and contacts 55, the solenoid SO is de-energized because the circuit controlling the relay switch is broken, due to the fact that current cannot flow from one contact 55 to the other through the cylinder 48, as explained in connection with Fig. 5. Therefore, the towels or other articles are held between the belts 31 or boards and plates 36 and slide along the said boards with the belts. As soon as the rear ends of the towels pass the contacts 55, the contacts engage the cylinder 48, so that the solenoid is energized moving the plunger 44 down and also the actuating rods 40 and links 37 swinging the boards 36 on their hinges 35 to inclined position shown in dot and dash lines in Fig. 1, whereby the towels or other articles are released and may drop onto a support of any desired type. It will be understood that when the first towel or other article has passed the contacts 55 the second one is approaching and the action of the apparatus is such that the cross-beam 41 and actuating rods 40 are quickly raised to restore the plates or boards 36 into contact with the belts 31 to grip and convey the next towel or article in the same manner as the preceding one.

The time required to advance each article depends, of course, on the lengths of the articles, and the rate of movements of the belts.

Any suitable type of support may be provided beneath the boards 36 and the space therebetween to receive the towels or other articles when released in the manner above described. In other words, there may be a plain table, or a continuous or movable conveyor which will carry the towels away at predetermined intervals; but in the present application I have illustrated a support which permits of stacking a great number of towels or other articles thereon, and wherein each successive towel is dropped substantially the same distance from the boards 36 during the stacking.

In Fig. 1, the top of the support is designated by the numeral 80 and is of a width wider than the space between the belts 31 and also wider than the towels or articles designated by the letter T, and also longer than the boards 36 and the towels or articles to be stacked. The top 80 has secured to its underside at the corners thereof, sockets 81 into which are threaded the ends of pipes or tubings 82 which are slidably mounted in the sleeves 15. Coil springs 83 are mounted in the tubings 82 and sleeves 15, and at their lower ends engage the sockets 17 and at their upper ends engage the underside of the top 80, and hold the tubings 82 in telescoping relation to the sleeves 15 with the lower ends of the tubings normally elevated. As the towels or other articles are deposited successively on the top 80, the weight thereof compresses the springs 83 and moves the tubings 82 downwardly in the sleeves 15. Thus, the towels may be piled or stacked on the top 80 with the uppermost towel always being deposited or dropped the same distance as the preceding towel. When the stack or pile of towels is removed from the top 80, the springs 83 move the top 80 and tubings 82 upwardly restoring the top to normal maximum elevated position relative to the boards 36.

Figure 7:
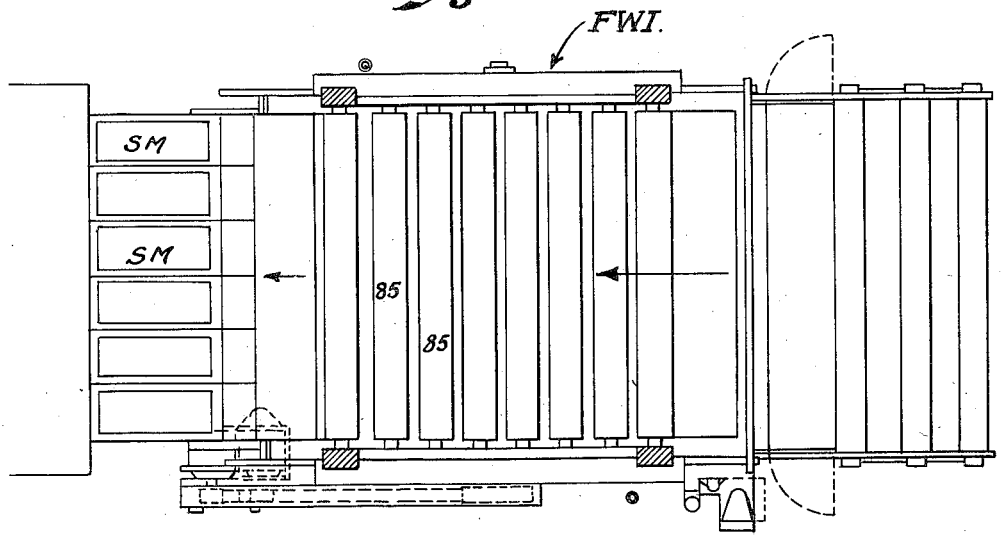
Fig. 7 is a top plan view, more or less diagrammatic, showing a plurality or battery of the stackers arranged for cooperation with a single flat work ironer or the like from which the articles are fed.

In Fig. 7, I have shown diagrammatically how a plurality or battery of the stacking machines above described, may be arranged to cooperate with a single flat work ironer. In Fig. 7, the stacking machines are designated generally by the letters SM and the flat work ironer generally by the letters FWI. The rollers 85 of the flat work ironer are of considerable length, so that they may simultaneously press or iron a plurality of parallel lines of towels or other articles, and as illustrated, there are six of the stacking machines to receive six lines of towels or other articles passing between and from the rollers 85 to the stacking machines.

I wish it to be understood that the stacking machines can be constructed to handle various sizes and types of articles, and that while I have described the invention particularly in connection with towels, it should be obvious that various other types of sheet materials can be handled and stacked thereby whether fed from a flat work ironer or from any other type of machine in which the articles are made, treated, or prepared.

In Fig. 8, I have shown a modification of the invention, wherein instead of providing the relatively movable electrical contacts between which the articles pass, I substitute therefor a photoelectric eye to make and break the circuit to control the solenoid. In Fig. 8, the primed numerals designate the corresponding parts of Figs. 1–6 designated therein by unprimed numerals. A platform or support 86 is mounted across the frame 10' above the pulleys 26' adjacent the intake end of the frame. The light source LS is mounted on the underside of the cross-piece 52' and projects the ray of light through an opening 87 in the said cross-piece upwardly toward the photoelectric relay 88. The light source and photoelectric relay are of known construction and commercially available on the market, and have been in general use on other apparatus for controlling electric circuits. The photoelectric relay 88 includes the usual phototube, amplifier and relay to control the circuits actuating the solenoid, shown and described in Figs. 1, 3 and 4. A phototube shield 89 is mounted through the support 86 and the beam of light projected by the light source LS, when no article is interposed between the light source LS and the photoelectric relay 88, is projected through the shield 89.

The operation of the apparatus shown in Fig. 8 is the same as that described in connection with Figs. 1–7, namely, so long as the ray of light projected from the light source LS enters the photoelectric relay 88, the solenoid is energized and the supports 36' are lowered. However, as the articles pass between the light source LS and the photoelectric relay 88, the ray of light is interrupted thereby and the solenoid is deenergized, whereupon the springs 43 of Fig. 1 return the cross head 41 to elevated position raising the supports 36' so that the articles may be fed therealong by the belts 31'. Obviously, as soon as the article has passed the opening 87 through which the ray of light is projected from the light source LS, the solenoid is again energized and lowers the supports 36' releasing the article in the manner previously specified, the operation being continuous or successive so that the articles are stacked one on the other.

While I have thus far illustrated and described the invention only in connection with automatically controlled electrically actuated means for effecting the stacking of the articles, I wish it to be understood that I do not limit the invention to electrically controlled or actuated means, and in Figs. 9 and 9a, I have shown mechanically controlled means, which similar to the electrically controlled means, is actuated by the movements of the articles.

In Fig. 9, a wheel or disc 90, corresponding to and located similarly to the disc 48 of Fig. 4, is keyed to the shaft 22'' which corresponds to the shaft 22 of Fig. 3, and 22' of Fig. 8. Beneath the disc 90 is a roller 91 mounted on a pin 92 carried by a bracket 93 which is mounted on top of a lever 94 fulcrumed at 95 on brackets 96 on a fixed support 97. A coil spring 98 is disposed between the plate 97 and the lever 94 normally urging the lever upwardly and thereby urging the roller 91 towards and into operative relation with respect to the disc 90. The free end of the lever 94 rests on a stem 99 which extends through an opening in gland nut 100 mounted in a valve casing 101. The casing 101 is provided with a chamber 102, in the lower portion of which is formed a port or seat 103 for a ball 104, disposed in alinement with and engaged by the lower end of the stem 99. The chamber 102 communicates through the port 103 with a passage 105 in the casing, and also communicates above the port 103 with a similar passage 106 in the casing. A pipe or conduit 107 is connected with a source of air under relatively low pressure, not shown, and communicates with the passage 105. Another pipe 108 communicates with the passage 106 and is connected into the top 109 of a controller C. A flexible diaphragm 110 forms with the top 109 of the controller a chamber 111 into which the pipe 108 leads. The diaphragm 110 is connected to the head 112 of a valve rod 113 which is surrounded by a coil spring 114 mounted between the head 112 and the bottom of chamber 115 in the controller. The spring normally holds the head 112 and diaphragm 110 in a predetermined elevated position. The base of the controller is formed with three chambers. The upper chamber 116 has connected thereto a pipe 117 which leads out to the atmosphere. Lower chamber 118 has leading thereinto a pipe 119 which is connected with a source of air under relatively high pressure (not shown). Intermediate chamber 120 is selectively communicable with the upper and lower chambers through ports 121 and 122, respectively. The stem 113 is provided at its lower end with a valve head 123 to close the port 122, and thereabove with another valve head 124 to close the port 121. The said valve heads are so spaced and arranged that when one of them is in closed relation to one of the ports, the other is in open relation to the other of the ports. This operation will be explained in detail hereinafter.

A pipe or conduit 125 leads from the chamber 121 into cylinder 126, as shown in Fig. 9a, the connection being made through the head 127 which closes the top of the cylinder and which is provided with an opening to receive the shaft 128 of piston 129. The cylinder 126 is mounted on a base 130 supported by the superstructure 19' corresponding to the superstructure 19 of Fig. 1. A packing 131 is provided in an over-sized bore in the head 127 around shaft 128 and is compressed by a gland nut 132 screw threaded into the head 127 and through which also extends the shaft 128. At its top the rod 128 is connected to the cross-head 41' corresponding to the cross-head 41 of Fig. 1, and connected at its opposite ends to actuating rods 40' corresponding to the actuating rods 40 of Fig. 1. Coil springs 43' normally hold the cross-head 41' in elevated position, so that the movable supports along which the articles are moved are held in elevated position during the passage of the articles therealong, as previously described. I would explain that in Fig. 9a, the springs are shown compressed and the cross-piece 41' is in its lowermost position, at which time the piston 129 is at the bottom of cylinder 126.

With the foregoing in mind, the operation of the apparatus shown in Figs. 9 and 9a is as follows:

As the articles enter the machine in the manner described in connection with Figs. 1–6, they pass between the disc 90 and the roller 91, moving the roller down, whereupon the lever 94 depresses the stem 99 and seats the ball 104 in port 103. This cuts off the supply of air through pipe 107, passages 105 and 106, and pipe 108 into chamber 111, so that the diaphragm 110 is in raised position. This causes the valve head 123 to close the port 122, so that the air under relatively high pressure cannot pass from pipe 119 to pipe 125 and consequently to cylinder 126. When this condition exists the springs 43' maintain the cross-head 41' elevated, and the movable supports along which the articles are moved, are also held elevated. As soon as each article passes from between disc 90 and roller 91, the spring 98 raises the lever 94, whereupon air under pressure enters through pipe 107 and passage 105 beyond ball 104, which is raised by the entering air, and then through pipe 108 into chamber 111, depressing the diaphragm 110. This downward movement of the diaphragm lowers stem 113 and seats valve head 124 in port 121, while simultaneously lowering valve head 123 from port 122 to the full line position of Fig. 9. Consequently air under relatively high pressure enters through pipe 119 through chamber 118 and port 122, passage 120 and pipe 125 into cylinder 126 depressing the piston 129 and consequently lowering the cross-beam 41', whereupon the supports along which the articles are moved are lowered and deposit the articles for stacking in the same manner as described in connection with Figs. 1–6.

In Fig. 10 I have shown a simple form of light sensitive electrical apparatus, or wiring diagram therefor, to control the stacking of the articles by operating the movable supports, which of course are preferably of the same construction and arrangement as those previously described and shown and wherein the supports are normally held in gripping relation to receive the articles and move them to the point where they are to be stacked, at which point the solenoid is energized to effect separation of the supports to release the articles and effect the stacking.

In Fig. 10 the letters LS indicate the same light source as in Fig. 8 and includes a lamp LA, the rays of which are projected upwardly toward the photoelectric cell or tube PhT which is connected by wires 135, 136 to the usual amplifier 137, also connected by wires 138 and 139 to relay winding 140 of the relay 141. A movable contact 142 of the relay is connected by wire 143 to a source of current supply while fixed contact 142' is connected by a wire 144 to the solenoid 145, similar to and controlling the same parts as the solenoid SO of Figs. 1 and 5. The winding of the solenoid 145 is also connected by a wire 146 to the other side of the source of current supply.

Obviously as a towel or other article T, shown diagrammatically in Fig. 10, enters the apparatus at the inlet end as shown in Fig. 8, it prevents the passage of the rays from the light source LS to the photoelectric cell or tube PhT so that the circuit is interrupted due to the fact that the relay 141 is not energized and the contacts 142, 143 are separated or are in the full line position of Fig. 10. The rays passing from the light source toward the photoelectric cell or tube are indicated in dot and dash lines in Fig. 10, and obviously when there is no object interposed between the light source and the photoelectric cell or tube a circuit is completed through said tube, wires 135, 136, amplifier 137, wires 138, 139, energizing the relay 141 and drawing the movable contact 142 down, whereupon the solenoid 145 is energized, and in the manner previously described causes separation of the supports on which the articles are moved depositing the articles at a predetermined point.

The arrangement described in connection with Fig. 10 is not my own invention, but is only illustrative. Of course I may use any other suitable wiring diagram for effecting the operation of my apparatus by light sensitive tubes or cells.

While I have shown and described two forms of electrically controlled apparatus, and only one form of mechanically controlled or operated apparatus, I wish it to be understood that the several embodiments of the invention shown and described are illustrative, and that various other types of electrically controlled and mechanically operated means may be employed without departing from the spirit of the invention and the scope of the appended claims.

I claim:

1. In apparatus for stacking sheet articles, cooperating members to grip opposite sides of the articles, one of said members being movable along the others to advance the articles therealong, and electrically actuated means controlled by the movements of the articles to cause said other members to be moved from gripping relation relative to said first members and articles therebetween to effect deposit of the articles at a predetremined point in their path of travel.

2. A machine for stacking sheet articles comprising a frame, a pair of spaced supports hingedly mounted on the frame at opposite sides thereof, a pair of endless belts or the like movable along said supports and adapted to grip the sheet articles against said supports and slide them therealong, an electric circuit, electrical contacts at one end of the frame connected in said circuit and between which the articles pass to control said electric circuit, and means controlled by said circuit to effect swinging movement of the supports relative to said belts to effect release and deposit of the articles when they have passed through said contacts.

3. A machine for stacking sheet articles comprising a frame, a pair of spaced supports hingedly mounted on the frame at opposite sides thereof, a pair of endless belts or the like movable along said supports, means normally holding the supports in position to engage said belts and to grip opposite edges of the sheet articles therebetween, an electric circuit, electrical contacts at one end of the frame connected in said circuit and between which the articles pass to control said electric circuit, and means controlled by said circuit to effect movement of the supports away from the belts when the articles have passed said contacts to effect release and deposit of the articles successively one on the other.

4. In a sheet article stacking machine, means to grip opposite edges of the articles and to advance them successively in a common direction, electrically controlled means to effect relative movement between said gripping means to effect release of said articles successively from said gripping means, and means engageable by the articles to operate said electrically controlled means.

5. In a machine for stacking sheet articles comprising a frame, a pair of spaced supports hingedly mounted on the frame adjacent opposite sides thereof, a pair of endless belts or the like movable along said supports and adapted to grip the sheet articles against said supports and slide them therealong, means normally urging said supports toward and into gripping relation with the belts and articles therebetween, an electric circuit, electrical contacts at one end of the frame connected in said circuit and between which the articles pass, a solenoid operable by said circuit, and means operable by said solenoid to effect swinging movement of the supports away from the belts to effect release and deposit of the articles.

6. A machine for stacking articles and including a frame, a pair of spaced supports movably supported on the frame to receive the articles, a pair of endless belts or the like movable above said supports and adapted to engage the articles and grip them against the supports to move the articles along said supports, means normally holding said supports in gripping relation with the belts and articles therebetween, and means operable by movement of the articles to effect relative movement between the supports to cause the supports to be moved out of gripping relation with the belts and articles to effect deposit or stacking of the articles.

7. A machine for stacking sheet articles comprising a frame, a pair of spaced supports hingedly mounted on the frame in spaced relation to each other and onto which the articles are moved, a pair of endless belts or the like movable along said supports and adapted to grip opposite sides of the sheet articles against said supports and slide them therealong, means normally holding the supports in gripping relation to the belts, means to move the supports out of gripping relation relative to the belts to effect deposit or stacking of the articles, and a member engageable by said articles to control said last means.

8. A machine for stacking sheet articles comprising a frame, a pair of supports hingedly mounted on the frame in spaced relation to each other, a pair of endless belts or the like movable along said supports and adapted to grip the sheet articles against said supports and slide them therealong, a superstructure at one end of the frame, means supported by said superstructure normally holding the supports in gripping relation relative to the belts, an electric circuit, a solenoid supported by said superstructure and connected in said circuit to move the supports out of gripping relation relative to the belts, and means at the other end of the frame controlled by the passage of the articles relative thereto to make and break said circuit and to control said solenoid.

9. A machine for stacking sheet articles comprising a frame, a pair of spaced supports along which the articles move hingedly mounted on the frame, means to grip the articles against said supports and move them therealong, means connected to the supports to move them on their hinges to effect swinging movement thereof to deposit the articles at a predetermined time, comprising a pair of links one connected to each support, means normally holding said links in position to maintain the supports in position for movement of the articles therealong, and means controlled by movement of the articles to effect movement of the links to swing the supports on their hinges into article releasing position.

FREDERIC B. CLARK.